United States Patent Office 3,475,668
Patented Oct. 28, 1969

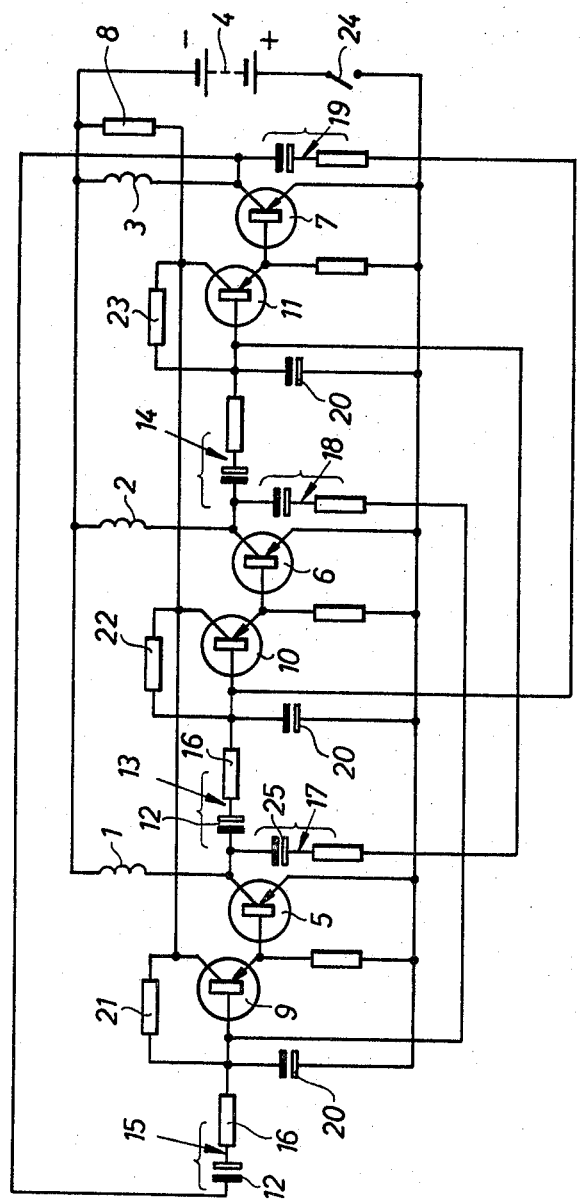

3,475,668
CONTROL CIRCUIT FOR A COMMUTATORLESS D.C. MOTOR
Winfried Mieslinger, Nuremberg, Germany, assignor to Gebruder Buhler Nachfolger G.m.b.H., Nuremberg, Germany, a German firm
Filed Dec. 20, 1966, Ser. No. 603,223
Claims priority, application Germany, Dec. 23, 1965, B 85,114
Int. Cl. H02k 29/02; H02p 3/08, 5/06
U.S. Cl. 318—138                    5 Claims

ABSTRACT OF THE DISCLOSURE

A commutatorless D.C. motor which has a rotating permanent magnet as a rotor and a plurality of phase windings as a multi-pole stationary winding is driven to rotate in a given direction by a control circuit. The control circuit comprises a plurality of identical power transistors equal to the number of phase windings. Each power transistor controls the flow of current through an associated phase winding. A first plurality of similar RC networks of a first kind connect each transistor to the next succeeding transistor to form a closed ring circuit. Each one of a second plurality of similar RC networks of a second kind are connected by each power transistor to a preceding power transistor, respectively.

---

The invention relates to a control circuit for a commutatorless D.C. motor comprising a rotating permanent magnet and a multi-pole stator winding comprising a number of phase windings. These phase windings are connected via a transistorised control circuit to a D.C. source.

Commutatorless D.C. motors of this kind have already been proposed. They operate by a rotating magnetic field being produced by the stator winding, the permanent-magnet rotor following such field. To produce this rotating magnetic field, the actuating D.C. current must be applied sequentially to the various phase windings of the stator winding in a particular direction of rotation, the phase windings being arranged uniformly around the machine periphery. The actuating D.C. current is stepped on from one phase winding to the next by operation of the electronic control circuit which can take the form of a multivibrator or of a sequential ring circuit.

The control circuits previously suggested have an auxiliary commutator which is operative over a desired range of starting speeds to ensure satisfactory starting torque and to ensure that the motor runs in a predetermined direction of rotation; in dependence upon rotor position, the auxiliary commutator allows the energisation of only one particular phase winding at a time and thus determines a particular direction of rotation. A device of this kind, which uses sliding contacts, has the advantage of ensuring a high starting torque and the disadvantage of comprising components which are mechanically stressed and which therefore wear and cause friction. Suggestions have been made to the effect that the mechanical auxiliary commutator be replaced by a non-contacting electronic auxiliary commutator. An electronic auxiliary commutator of this kind, which comprises resistances dependent upon magnetic fields, obviates the disadvantages just mentioned of a mechanical auxiliary commutator but requires an appreciable outlay for production and circuitry, with a consequent increase in the cost of the control circuit.

It is an object of this invention to provide a control circuit which, while obviating the disadvantages hereinbefore set forth, enables a commutatorless D.C. motor to start reliably and rotate in a desired direction.

According to the invention, therefore, there is provided a transistorised control circuit for a commutatorless D.C. motor comprising a rotating permanent magnet and a stationary multi-pole winding comprising a plurality of phase windings intended to be connected via the control circuit to a D.C. source. The control circuit comprises a plurality of identical control stages which are equal in number to the phase windings. Each control stage has a power transistor to control the flow of current through the associated phase winding. Each control stage is connected to the next through one of a first plurality of RC networks. There are a second plurality of similar RC networks dissimilar to the first plurality of RC networks, each control stage being connected to the preceding stage through one of the second plurality of RC networks.

A control circuit of this kind makes it possible to obviate mechanical or electronic auxiliary commutators. Over the entire range of motor speeds, the various phase windings of the armature winding are energised solely by the A.C. voltage which the rotating permanent magnet produces in the individual phase windings. This control circuit also leads to satisfactory motor efficiency.

Preferably each stage includes a drive transistor connected to its power transistor, there being provided a resistor to which the collector of each drive transistor is connected. The circuit elements are so devised that the motor starts to be energised from the stationary state as a result of the natural frequency of the control stages immediately when the actuating D.C. is applied, it being immaterial which of the control stages of the control circuit energises first. In this context, some part is played by the minor differences which are bound to exist in the value of the components used for the individual control stages and by the position of the permanent-magnet rotor relatively to the various phase windings and the inductance thereof resulting from such position. An optimum relationship between the values of the RC networks of the two RC network chains or loops can be determined empirically to ensure that the rotor starts to run in a desired predetermined direction of rotation—i.e., that the control stages of the control circuit are stepped on in a particular sequence.

Rotation-inhibiting means, preferably pawl and ratchet means, which are coupled with the rotor and which are mechanically operative in one of the two directions of rotation can be provided instead of one of the RC networks of the control circuit; this feature may be very useful for some applications of motors of this kind.

Preferably the circuit includes switch means for enabling the connections of the two pluralities of RC networks to be changed over.

Other features of the invention can be gathered from the following description, reference being made to the drawing which shows a control circuit according to the invention connected to the armature winding of a commutatorless D.C. motor.

The winding of the motor under consideration has three phase windings 1, 2, 3 which, in a way which is not shown, are disposed in a manner rather like a three-phase winding at a 120° offset from one another around the machine periphery. The windings are connected in a control circuit whose star point is connected to the negative pole of D.C. voltage source 4.

Each phase winding 1, 2, 3 is disposed in the collector circuit of a power transistor 5, 6, 7 respectively; to facilitate power triggering, drive transistors 9, 10, 11 arranged as emitter follower stages are provided for the power transistors 5, 6, 7 respectively. The collectors of the transistors 9, 10, 11 are connected via a common resistance 8 to the negative pole of the source 4 and, via respective feedback resistors 21, 22, 23 to their bases.

The power transistors 5, 6, 7 form, together with their respective drive transistors 9, 10, 11 individual and identical control stages of the control circuit. Each control stage is connected via a respective one of first RC networks 13, 14, 15 respectively, each network comprising an electrolytic capacitor 12 and a resistance 16, to the immediately following control stage to form a closed ring circuit. Thus in the particular embodiment shown, there is a closed cycle of operations in the sequency power transistors 5–6–7–5–6. Also, each control stage is connected, via a second RC network 17 or 18 or 19 of consistent dimensioning, to the immediately previous control stage —i.e., in the particular example shown, in the sequence of power transistors 5–7–6–5. The first RC networks 13, 14, 15 differ from the second RC networks 17, 18, 19—i.e., they produce a different phase shift of the A.C. voltages which the rotating permanent-magnet rotor of the motor produces in the phase windings 1, 2, 3. The values of the two RC networks can be brought into an advantageous relationship to one another which can be found empirically and which is such as to ensure that the motor always starts and runs to the same direction while retaining a satisfactory efficiency. Consequently, for instance, the A.C. voltage induced in phase winding 1 always acts first via RC network 13 to switch drive transistor 10 of power transistor 6 of the immediately following control stage into the conductive state and does not act first via the second RC network 17 to bring the drive transistor 11 of the preceding transistor 7 of the immediately previous control stage into the conductive state.

The control circuit operates as follows:

After the source 4 has been connected to the control circuit by closure of a switch 24, one of the control stages starts by causing the drive transistor 9 or 10 or 11 to conduct so that, via the associated power transistor 5 or 6 or 7, a direct current flows from the positive terminal of source 4 through the emitter and collector of the power transistor and through the associated phase winding 1 or 2 or 3 to the negative pole of the source 4. The resulting magnetic field produced in the particular phase winding concerned applies a torque to the permanent-magnet rotor. This starts to rotate so that a voltage is produced in the phase windings. The A.C. voltage induced in the energised phase winding, for instance, phase winding 1, is superimposed upon the D.C. voltage and goes through coupling capacitor 12 of the first RC network 13 to the next control stage comprising the drive transistor 10, and through the coupling capacitor 25 of the second RC network 17 to the immediately previous control stage comprising the drive transistor 11. The control stages are so arranged that, when the induced voltage in the phase winding, and transmitted through the capacitor, brings the potential between the base of one of the drive transistors and the positive pole of the voltage source 4 to near its peak negative value that drive transistor conducts; in this particular case, the drive transistor 10 conducts first, so that there is a flow of D.C. current through the emitter-collector circuit of the associated power transistor 6 and the phase winding 2. The result of the different dimensionings as between the RC networks 13 and 17 is that the immediately following drive transistor 10 is always switched before the immediately previous drive transistor 11. Conveniently, in this embodiment the circuit elements of the RC network 13 and the capacitor 20 can be so arranged that the A.C. voltage acting on the base of the immediately following biasing transistor 10 lags by about 60 electrical degrees the voltage induced in the phase winding 1. Consequently, once rotation has been initiated by a flow of D.C. current through phase winding 1, the motor rotor is always attracted first towards phase winding 2 and then towards phase winding 3 and thus rotates in a predetermined direction.

Consequently, the control circuit ensures that there is a continuous stepping-on, at a timing determined by the voltages induced in the phase windings, from one control stage to the next and therefore that there is a stepping-on of the direct current flow from one phase winding to the next in a predetermined direction of rotation, right from the time that the motor starts to operate.

As already stated, the connections of the two different RC networks can be changed over by a changeover switch to enable the direction of rotation to be reversed. The direction of rotation could also be reversed by altering the resistance of the two RC networks in opposite directions. If required, the second RC networks 17, 18, 19 could be replaced by mechanical rotation-inhibiting means which co-operate with the motor rotor and which are operative in the unwanted direction of rotation. The number of phase windings and, correspondingly, the number of stages in the control circuit, is not limited to three. Similar considerations apply to the number of poles of the machine.

What I claim is:

1. A transistorised control circuit for a commutatorless D.C. motor comprising a rotating permanent magnet and a stationary multi-pole winding comprising a plurality of phase windings intended to be connected via the control circuit to a D.C. source, the control circuit comprising a plurality of identical control stages which are equal in number to the phase windings, each control stage having a power transistor to control the flow of current through the associated phase winding, each power transistor having a base, collector and emitter, a first plurality of similar RC networks, each control stage being connected to the next through one of the said first plurality of RC networks to form a closed ring circuit, and a second plurality of similar RC networks dissimilar to the said first plurality of RC networks, each control stage being connected to the preceding state through one of the said second plurality of RC networks.

2. A circuit as claimed in claim 1 wherein each stage includes a drive transistor connected to its associated power transistor, and a resistor which is connected to the collector of each drive transistor.

3. A circuit as claimed in claim 2 wherein each control stage comprises a resistor connected between the base and the collector of the drive transistor.

4. A circuit as claimed in claim 1, modified in that rotation-inhibiting means which are coupled with the rotor and are mechanically operative in one of the two directions of rotation are provided instead of the second plurality of RC networks.

5. A circuit as claimed in claim 1, which includes switch means for enabling the connections of the two pluralities of RC networks to be changed over.

References Cited

UNITED STATES PATENTS 3,274,471  9/1966  Moczala.
3,304,481  2/1967  Saussele _____ 318—138
3,329,852  7/1967  Saussele et al. _____ 318—138

ORIS L. RADER, Primary Examiner

G. R. SIMMONS, Assistant Examiner

U.S. Cl. X.R.

318—254